A. J. TOUSSAINT.
GAS FEEDING DEVICE FOR COOKING STOVES.
APPLICATION FILED JULY 24, 1913.

1,133,071.                                         Patented Mar. 23, 1915.
                                                        3 SHEETS—SHEET 3.

WITNESSES:                                          INVENTOR:
John C. Sanders                                     Auguste Jules Toussaint
M. B. Cottrell                                      BY
                                                    ATTY

UNITED STATES PATENT OFFICE.

AUGUSTE JULES TOUSSAINT, OF PARIS, FRANCE.

GAS-FEEDING DEVICE FOR COOKING-STOVES.

1,133,071.  Specification of Letters Patent.  Patented Mar. 23, 1915.

Application filed July 24, 1913. Serial No. 780,941.

*To all whom it may concern:*

Be it known that I, AUGUSTE JULES TOUSSAINT, a citizen of the Republic of France, of 10 Rue Sedaine, in the city of Paris, Republic of France, have invented a Gas-Feeding Device for Cooking-Stoves, of which the following is a full, clear, and exact description.

It is well known that for using a gas stove it is necessary to open the cock of the gas conduit-pipe and then the cock of the stove-pipe corresponding to the burner to be used; for extinguishing said burner when required, the cock of the stovepipe is closed but very often one neglects or forgets to turn off the cock of the conduit-pipe, which is daily the cause of asphyxies or explosions. Besides neglecting or forgetting to close said cock, a cock slightly worn out may open by the grazing of a coat sleeve or by the shock of a saucepan. Moreover, said cocks are within reach of a child. Furthermore, a conduit-pipe rubber tube in bad condition may burst under the pressure of the gas. Finally a cock a little loose and slightly open may open of itself under the pressure of the gas.

The invention consists in a device which may be fixed on any existing stoves so as to avoid asphyxies or explosions if one forgets to close: 1° the cock of the conduit pipe,—2° the cock of the gas-meter. This device is fixed in the place of the existing stove-pipe, it allows of doing away with the cocks of the latter, the said cocks being arranged on a feeder screwed on the conduit-pipe, in the place of the existing gas unions and receiving flexible pipes leading to a bundle of conveying tubes arranged in front of the stove and on which are branched the tubes leading the gas to the burner. This device does not comprise any cock between the conduit-pipe and the burners, and it is therefore necessary for extinguishing a burner to turn off, on the feeder, its corresponding cock, so that the conduit-pipe is closed at the same time.

Figure 1:
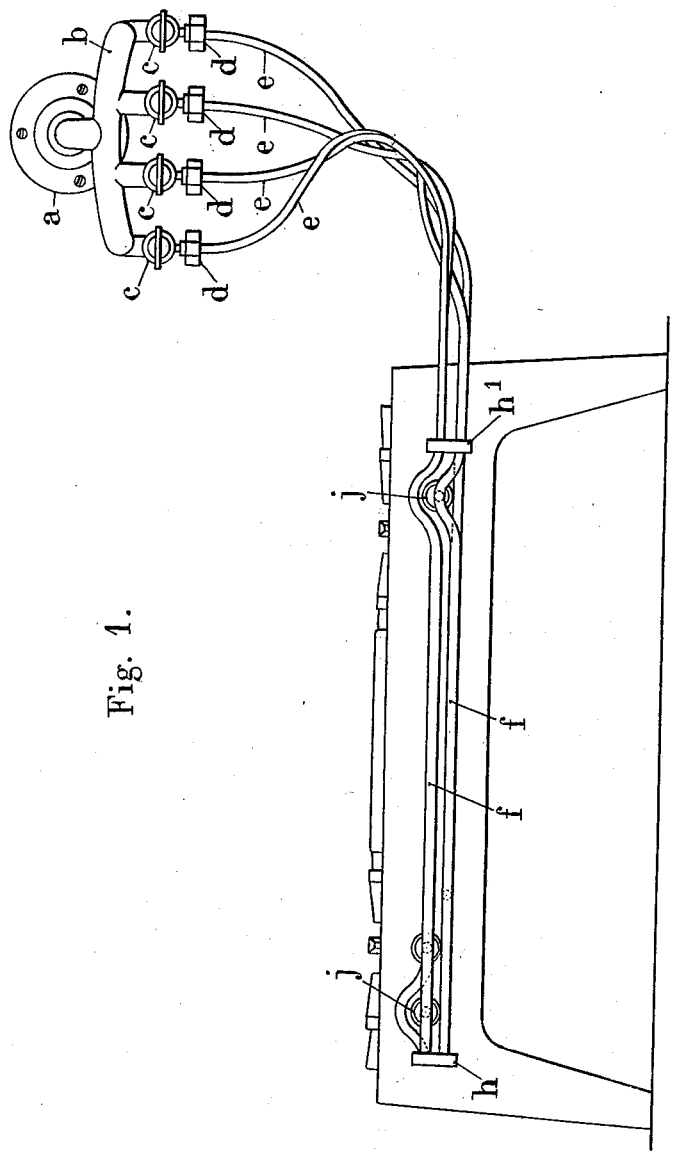
Figure 2:
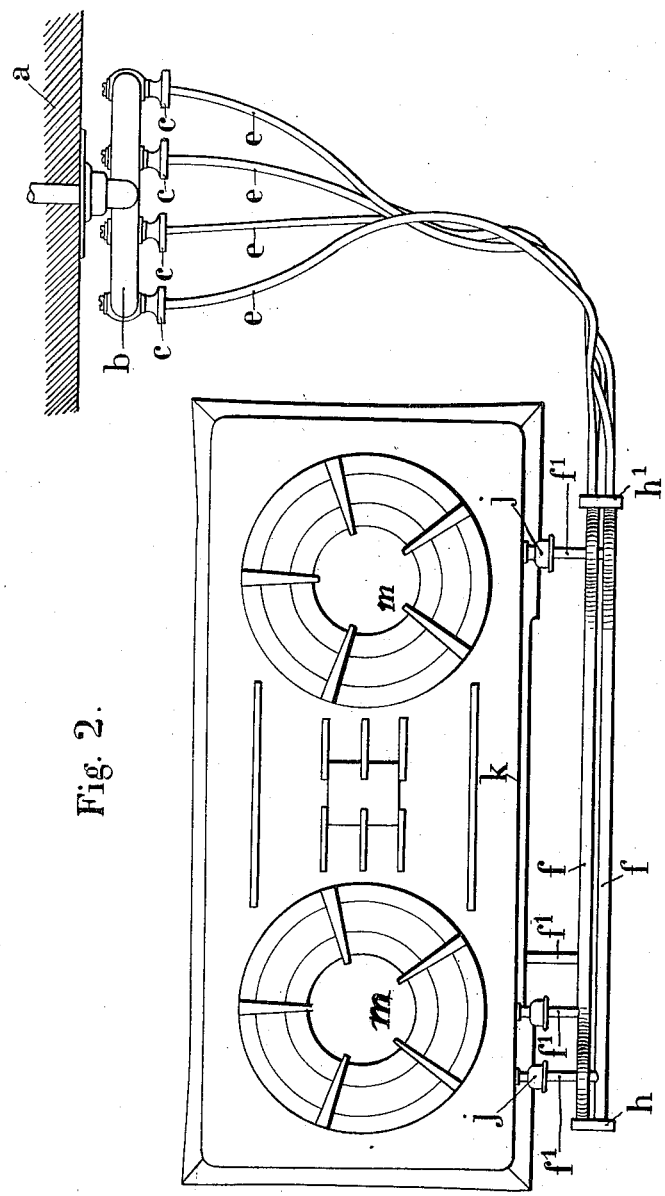
Figure 3:
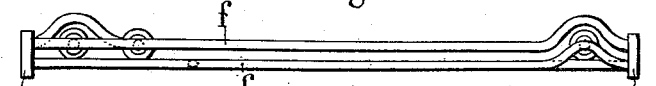
Figure 4:
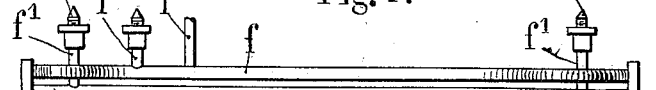
Figure 5:
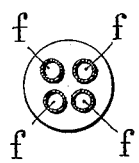
Figure 6:
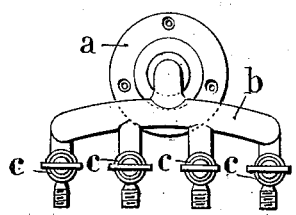
Figure 8:
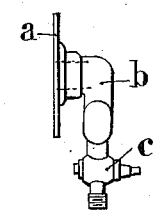
Figure 7:
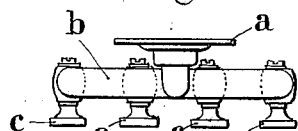
Figure 9:
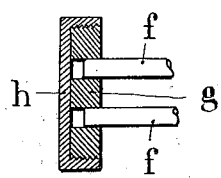
Figure 10:
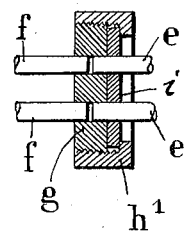
Figure 11:
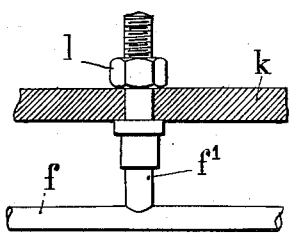

The invention will be described hereafter with reference to the accompanying drawing in which:

Figure 1 is an elevation of the present device in use; Fig. 2 is a plan view thereof; Fig. 3 shows in elevation the bundle of tubes of said device; Fig. 4 is a plan view thereof; Fig. 5 is a cross section of the bundle of tubes; Fig. 6 shows in front view a feeder which is a part of the pressure apparatus; Fig. 7 is a plan view thereof; Fig. 8 is a side view thereof; Fig. 9 shows in section the assemblage of the bundle of tubes on the side opposed to the feeder. Fig. 10 illustrates in section the assemblage of the bundle of tubes and of the flexible tubes; Fig. 11 shows in longitudinal section a modification of the branches of the above bundle of tubes.

As illustrated in the drawings (Figs. 1 to 10), the present safety apparatus for gas cooking stoves comprises a feeder constituted by a bracket $a$, a collector $b$ and four cocks $c$ for instance. The bracket $a$ is perforated at its center and then screw threaded so that it may be screwed on any existing gas unions. The end of the four cocks $c$ is screw threaded for receiving the unions $d$ of the flexible tubes $e$ connecting the feeder to the bundle of tubes of the stove. The bundle of tubes is constituted by a number of brass tubes $f$, four for instance, as illustrated in Fig. 5, and sufficiently spaced apart for facilitating their cleaning. These tubes $f$ are brazed, at one end, on a disk $g$, as shown in Fig. 9, and closed by a stopper $h$ screwing on this disk; on the opposite side (see Fig. 10), the tubes $f$ are also brazed on a disk $g$ in which enter the ends of the gas inlet flexible tubes $e$ brazed on a washer $i$ and the whole is held in place by a screw cap $h^1$ perforated at its center. This arrangement, similar on both sides, allows of mounting the flexible tubes $e$ either from one end or from the other end of the bundle of tubes according to the position of the feeder.

The tubes $f$ of the tubular bundle comprise branches $f^1$ brazed on these tubes and which are screw threaded so that they may each receive a union $f^2$ provided with an injector (Fig. 4), said union screwing on the gas inlets $j$ arranged on the front $k$ of the stove and leading to the burners $m$. When the gas inlets are within the stove, the branches $f^1$ pass through the front $k$ of this stove for leading to the burners. In this case, these branches are fixed by a nut $l$ on the front of the stove as illustrated in Fig. 11 of the drawing.

I claim—

1. In apparatus of the class described, in combination, a gas stove provided with a plurality of burners, conveying tubes mounted upon said stove and provided with branches communicating with said burners, there being a separate conveying tube for each burner, a feeder adapted to be attached to a gas conduit, said feeder being provided with as many outlets as there are conveying tubes, each of said outlets being provided with a cock for controlling the flow of gas therethrough, and flexible tubes extending between said conveying tubes and said controlling cocks, said apparatus being free from cocks between said burners and the said cocks in said feeder outlets.

2. In apparatus of the class described, in combination, a gas stove provided with a plurality of burners, conveying tubes mounted upon said stove and provided with branches communicating with said burners, there being a separate conveying tube for each burner, said tubes being secured together to form a unit, a feeder adapted to be attached to a gas conduit, said feeder being provided with as many outlets as there are conveying tubes, each of said outlets being provided with a cock for controlling the flow of gas therethrough, and flexible tubes extending between said conveying tubes and said controlling cocks, said apparatus being free from cocks between said burners and the said cocks in said feeder outlets.

The foregoing specification of my gas feeding device for cooking stoves signed by me this 15th day of July, 1913.

AUGUSTE JULES TOUSSAINT.

Witnesses:
  LUCIEN MEMMINGER,
  RENÉ THIRIOT.

Copies of this patent may be obtained for five cents each, by addressing the "Commissioner of Patents, Washington, D. C."